(12) United States Patent
Ghafourifar et al.

(10) Patent No.: US 12,008,559 B1
(45) Date of Patent: *Jun. 11, 2024

(54) DECENTRALIZED BLOCKCHAIN FOR ARTIFICIAL INTELLIGENCE-ENABLED MULTI-PARTY SKILLS EXCHANGES OVER A NETWORK

(71) Applicant: Entefy Inc., Palo Alto, CA (US)

(72) Inventors: Alston Ghafourifar, Los Altos Hills, CA (US); Mehdi Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,927

(22) Filed: Jun. 17, 2022

Related U.S. Application Data

(63) Continuation of application No. 16/884,007, filed on May 26, 2020, now Pat. No. 11,367,068, which is a
(Continued)

(51) Int. Cl.
  *G06Q 20/38* (2012.01)
  *G06Q 30/0201* (2023.01)
  (Continued)

(52) U.S. Cl.
  CPC ..... *G06Q 20/3829* (2013.01); *G06Q 30/0206* (2013.01); *H04L 9/0637* (2013.01);
  (Continued)

(58) Field of Classification Search
  CPC ........... G06Q 20/3829; G06Q 30/0206; G06Q 2220/10; H04L 9/0637; H04L 67/1042; H04W 4/70
  See application file for complete search history.

(56) References Cited

U.S. PATENT DOCUMENTS

| | | | |
|---|---|---|---|
| 2002/0165838 A1* | 11/2002 | Vetter | G06F 11/3447 714/E11.197 |
| 2014/0108263 A1* | 4/2014 | Ortiz | G06Q 20/36 705/44 |

(Continued)

FOREIGN PATENT DOCUMENTS

| | | | | |
|---|---|---|---|---|
| WO | WO-2016012903 A1 * | 1/2016 | ......... | G06F 16/2455 |
| WO | WO 2018126077 | 7/2018 | | |

*Primary Examiner* — Patrick McAtee
*Assistant Examiner* — Vincent I Idiake
(74) *Attorney, Agent, or Firm* — Haynes and Boone, LLP

(57) ABSTRACT

An improved decentralized, blockchain-driven network for artificial intelligence (AI)-enabled skills exchange between Intelligent Personal Assistants (IPAs) in a network is disclosed that is configured to perform computational tasks or services (also referred to herein as "skills") in an optimally-efficient fashion. In some embodiments, this may comprise a first IPA paying an agreed cost to a second IPA to perform a particular skill in a more optimally-efficient fashion. In some embodiments, a skills registry is published, comprising benchmark analyses and costs for the skills offered by the various nodes on the skills exchange network. In other embodiments, a transaction ledger is maintained that provides a record of all transactions performed across the network in a tamper-proof and auditable fashion, e.g., via the use of blockchain technology. Over time, the AI-enabled nodes in the system may learn to scale, replicate, and transact with each other in an optimized—and fully autonomous—fashion.

20 Claims, 10 Drawing Sheets

Related U.S. Application Data continuation of application No. 15/859,041, filed on Dec. 29, 2017, now abandoned.

(51) Int. Cl.
*H04L 9/06* (2006.01)
*H04L 67/1042* (2022.01)
*H04W 4/70* (2018.01)

(52) U.S. Cl.
CPC ........... *H04L 67/1042* (2013.01); *H04W 4/70* (2018.02); *G06Q 2220/10* (2013.01)

(56) References Cited

U.S. PATENT DOCUMENTS

| | | |
|---|---|---|
| 2015/0199214 A1 | 7/2015 | Lee et al. |
| 2017/0046693 A1* | 2/2017 | Haldenby ............ G06Q 20/367 |
| 2017/0287090 A1* | 10/2017 | Hunn ...................... H04L 63/12 |
| 2018/0025270 A1* | 1/2018 | John ...................... G06N 20/00 706/25 |
| 2018/0198694 A1* | 7/2018 | Wells .................. H04L 67/1008 |
| 2019/0034413 A1* | 1/2019 | Rosewell ............. G06F 16/325 |
| 2019/0052722 A1* | 2/2019 | Gasking ................ H04L 67/306 |

* cited by examiner

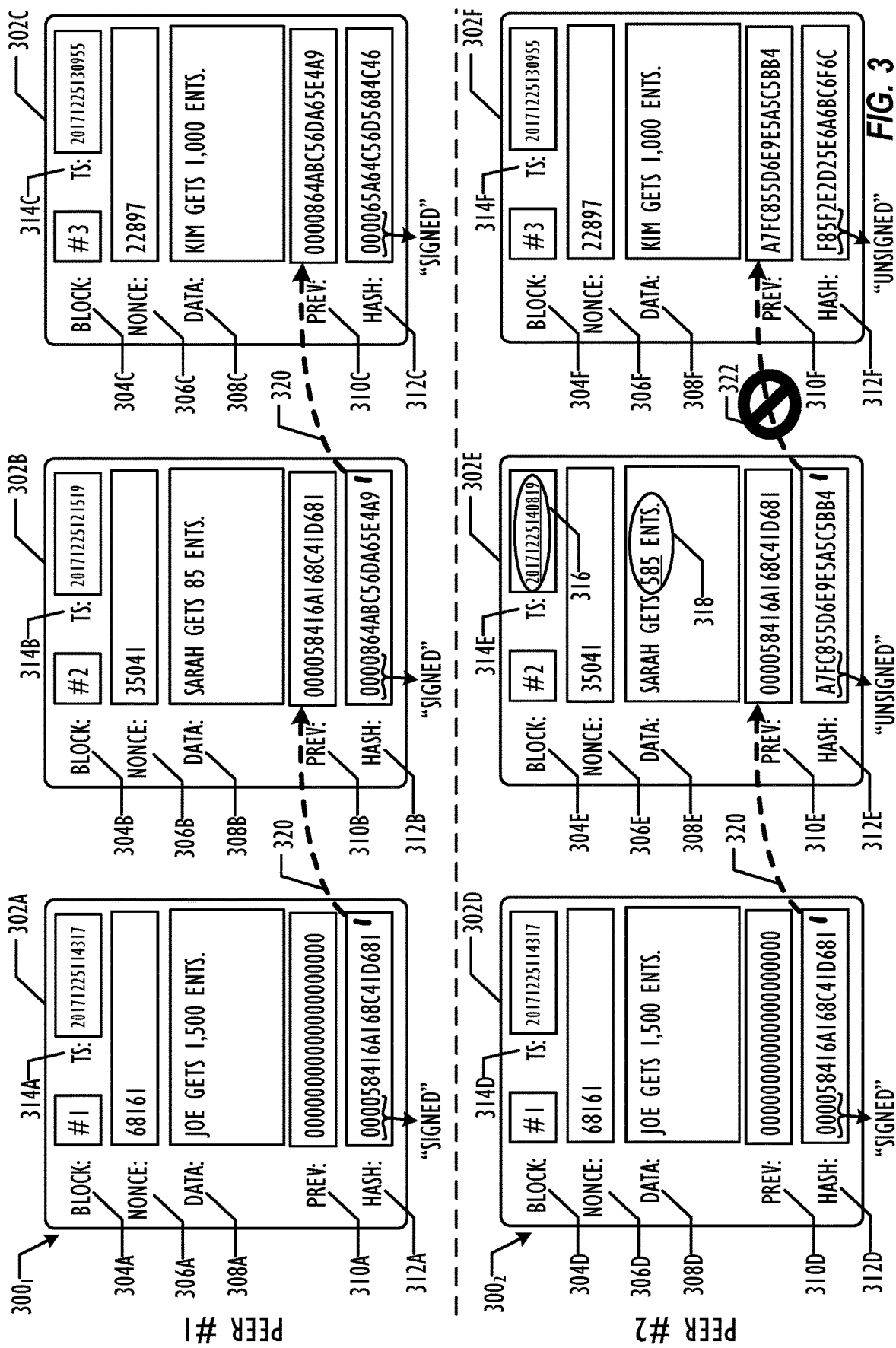

SKILLS REGISTRY 420

| SERVICE ID 422 | FUNCTION ID 424 | PERF. BENCHMARK 426 | AVAILABILITY 428 | COST 430 |
|---|---|---|---|---|
| JOE'S PIX | 0112 | 4.12/5.0 | 90% | 1,000e/PIC |
| WIDGETCO VIDZ | 0116 | 12M:33S | 99% | 4,000e/VID |
| WIDGETCO DOX | 0237 | 4.99/5.0 | 98% | 10,000e/DOC |
| KIM'S PIX | 0112 | 4.95/5.0 | 94% | 1,200e/PIC |
| WIDGETCO PIX | 0112 | 4.98/5.0 | 97% | 800e/PIC |
| JOE'S VIDZ | 0116 | 42M:18S | 85% | 1,000e/VID |
| SARAH STOX | 0345 | 56% | 94% | 100e/STOCK |
| SARAH STORE | 0817 | 95% | 95% | 8000e/GB/MO. |

432 — JOE'S PIX
434 — WIDGETCO VIDZ
436 — WIDGETCO DOX
438 — KIM'S PIX
440 — WIDGETCO PIX
442 — JOE'S VIDZ
444 — SARAH STOX
446 — SARAH STORE

*FIG. 4B*

TRANSACTION LEDGER 460

| TXN ID 462 | FUNCTION ID 464 | FROM 466 | TO 468 | COST 470 | TIMESTAMP 472 |
|---|---|---|---|---|---|
| 00011234 | 0237 | JOE | WIDGETCO | 10,000e | 20171225104256 |
| 00011235 | 0116 | KIM | JOE | 14,000e | 20171225161213 |
| 00011236 | 0237 | SARAH | WIDGETCO | 30,000e | 20171226084422 |
| 00011237 | 0112 | SARAH | KIM | 3,600e | 20171226210425 |
| 00011238 | 0817 | JOE | SARAH | 8,000e | 20171226031424 |
| 00011239 | 0116 | KIM | JOE | 1,000e | 20171227081117 |
| 00011240 | 0112 | JOE | KIM | 4,800e | 20171227221410 |
| 00011241 | 0237 | JOE | WIDGETCO | 40,000e | 20171228110105 |

DECENTRALIZED BLOCKCHAIN FOR ARTIFICIAL INTELLIGENCE-ENABLED MULTI-PARTY SKILLS EXCHANGES OVER A NETWORK

CROSS REFERENCE TO RELATED APPLICATION

This application is a continuation of U.S. patent application Ser. No. 16/884,007, filed May 26, 2020, which is a continuation of and claims priority to U.S. patent application Ser. No. 15/859,041, filed Dec. 29, 2017, all of which are incorporated by reference herein in their entirety.

TECHNICAL FIELD

This disclosure relates generally to apparatuses, methods, and computer readable media for a decentralized, secure network for artificial intelligence (AI)-enabled performance and exchange of computational tasks and services between network nodes.

BACKGROUND

Intelligent personal assistant (IPA) software systems comprise software agents that can perform various functions, e.g., computational tasks or services, on behalf of an individual user or users. IPAs, as used herein, may simply be thought of as computational "containers" for certain functionalities. The functionalities that are able to be performed by a given IPA at a particular moment in time may be based on a number of factors, including: a user's geolocation, a user's preferences, an ability to access information from a variety of online sources, the processing power and/or current performance load of a physical instance that the IPA is currently being executed on, and the historical training/modification/customization that has been performed on the IPA. As such, current IPA software systems have fundamental limitations in terms of their capabilities and abilities to perform certain computational tasks.

For example, in some instances, a first IPA executing on a first device on a network may be able to perform a particular first computational task or service (also referred to herein as a "skill") with a very high degree of accuracy, but may be executing on a physical instance that lacks the necessary computational power or capacity to perform the particular first computational task or service in a reasonable amount of time. Likewise, a second IPA, e.g., being executed on a device belonging to another user on the same network, may have excellent computational power and capacity, but not have been trained to perform the first computational task or service with a high degree of accuracy. As such, the particular first computational task or service is not likely to be able to be efficiently performed by either the first IPA or the second IPA, causing, in effect, an inevitable marketplace inefficiency in the overall skills network.

Such a scenario may not provide for a satisfactory (or efficient) user experience across the many users and/or nodes of the network. In the context of AI-enabled IPAs, the IPAs may be able to "learn" and improve their performance of certain computational tasks or services over time. AI-enabled IPAs may also be able to determine, over time, more efficient usages of the network's overall computational capacity to perform computational tasks or services at a high level of performance and at a low operational cost, e.g., by 'farming out' certain computational tasks to other IPAs and/or nodes in the network that can perform the task in a more optimal manner.

However, in order to be able to act, react, and interoperate in an efficient manner, the various IPAs distributed across a network must have accurate information as to the current status of the various skills that the nodes on the network are able to perform (e.g., in terms of benchmarking scores, availability, and/or costs)—as well as the ability to determine the most optimal nodes that could be used to perform such skills, given computational and cost constraints.

Moreover, in order to reliably provide "value," i.e., payment for services rendered, to other nodes in the aforementioned network for the performance of skills in an optimized manner, it is important that a secure ledger of transactions performed across the network be maintained in a tamper-proof and auditable fashion.

The subject matter of the present disclosure is directed to overcoming, or at least reducing the effects of, one or more of the problems set forth above. To address these and other issues, techniques that enable a decentralized, secure network for the AI-enabled performance and exchange of computational tasks and services between nodes on a network are described herein.

BRIEF DESCRIPTION OF THE DRAWINGS

FIG. 3 shows an exemplary implementation of blockchain technology, according to one or more disclosed embodiments.

FIG. 4B illustrates an exemplary skills registry for an AI-enabled skills exchange network, according to one or more disclosed embodiments.

FIG. 4C illustrates an exemplary transaction ledger for an AI-enabled skills exchange network, according to one or more disclosed embodiments.

DETAILED DESCRIPTION

Figure 1:
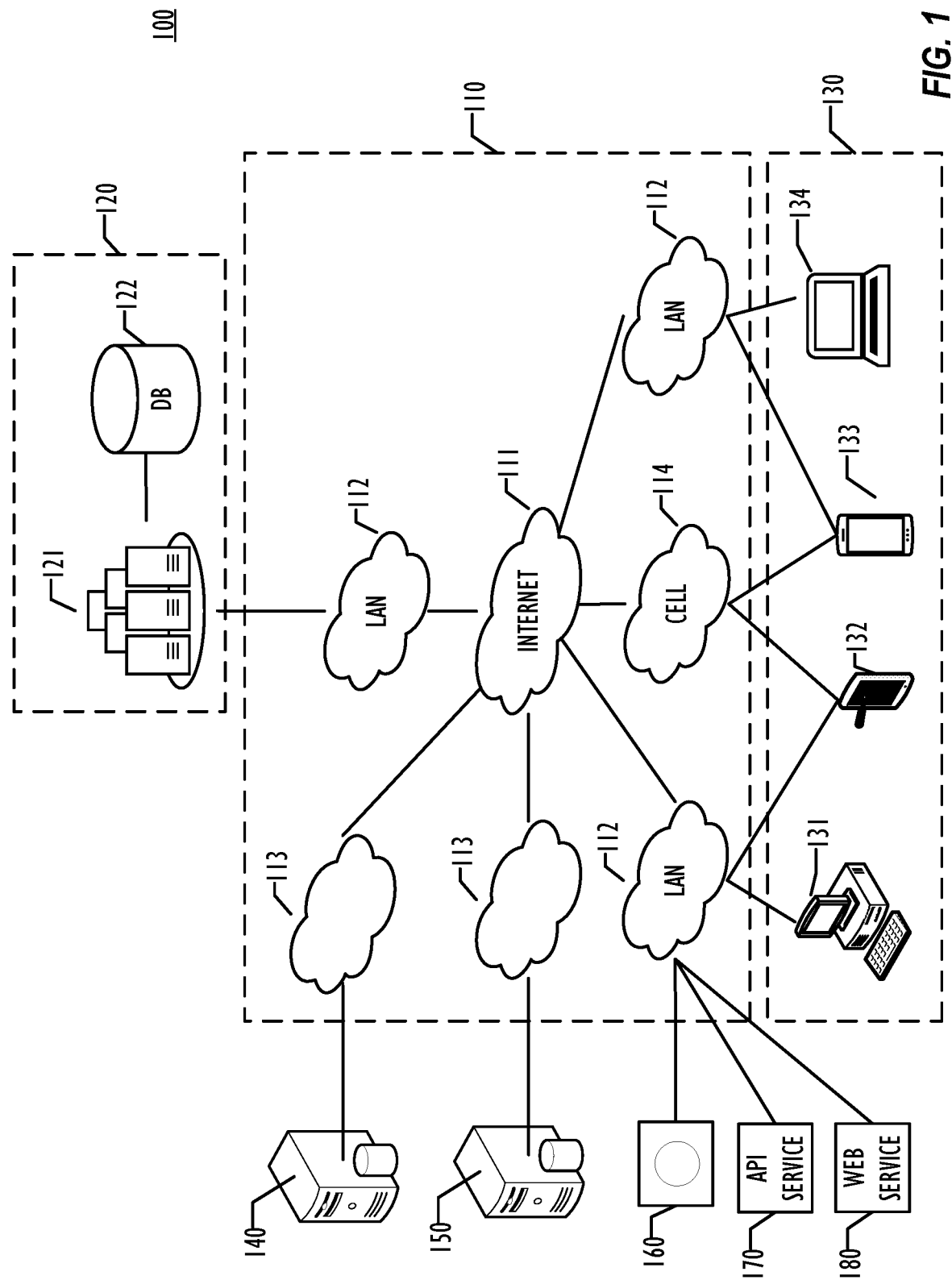
FIG. 1 is a block diagram illustrating a network architecture infrastructure, according to one or more disclosed embodiments.

Disclosed herein are systems, methods, and computer readable media for implementing an improved decentralized, secure, e.g., blockchain-driven, network for AI-enabled skills exchange between IPAs that are configured to perform computational tasks or services in an optimally-efficient fashion. In the embodiments described herein, IPAs may be thought of as computational "containers" for certain functionalities, able to be executed on any variety of physical computing device. Further, the IPA containers may be scaled, replicated (i.e., run as multiple instances of the same container), and transact with other IPAs. The IPAs according to the embodiments described herein may thus be able to interact with one another, if so desired, in a fully autonomous fashion, at network-level speeds, in order to reach an optimal performance across the AI-enabled skills exchange network.

In some embodiments, a skills registry is published to the skills exchange network, comprising benchmark analyses and costs for the various skills offered by the various IPA nodes on the network. Examples of skills offered by nodes on the network may include, e.g., performing object or face recognition tasks on photos or videos, summarizing the contents of a document, predicting the future price of a particular stock, or even passive skills, such as offering storage space for files of any kind to other nodes on the network. Examples of the kinds of information that may be published to the skills registry may include, e.g., a unique service identifier, a function identifier, one or more standardized performance benchmarks for a particular skill (e.g., 10 photos analyzed per minute, accuracy of 99.7%, etc.), network availability levels (historical and/or current), and the cost per unit for a particular node to perform a particular skill that it has advertised to the skills registry. In some embodiments, the skills registry may be stored as a decentralized skills registry.

In other embodiments, this network may comprise a first IPA paying an agreed cost to a second IPA to perform a particular skill. A first IPA may pay a second IPA an agreed cost to perform skill, e.g., if the second IPA is able to perform the skill in a more optimally efficient fashion, if the first IPA is not programmed to know how to perform the skill, or if the first IPA simply does not currently have access to the necessary computational resources to perform the skill. In some embodiments, the agreed cost may be paid in the form of a token or other type of cryptocurrency. The value of a token used within the network (also referred to herein as an "ENT") may fluctuate based on the supply, demand, and/or perceived values of the services offered by the network. The value of the token may also be tied to another monetary asset, such as a more traditional state-sponsored currency, e.g., the U.S. dollar, or another form of digital currency or decentralized cryptocurrency, e.g., bitcoins.

In still other embodiments, a secure transaction ledger may be maintained that provides a record of all transactions performed across the network in a tamper-proof and auditable fashion, e.g., via the use of blockchain or other decentralized consensus-based technologies. By storing the database in a decentralized fashion, no single trusted copy of the transaction ledger exists, and no single user/node is trusted more than the other nodes in the network. In such a system, a given record in the transaction ledger cannot be changed or altered retroactively without the alteration of all subsequent blocks in the blockchain, as well as the consensus of more than 51% of the network peers (by computational power) storing replicated copies of the blockchain. This ensures the validity and auditability of the recorded network transactions, and allows nodes to validate and verify that another node has sufficient tokens to pay for the service(s) that they are requesting.

According to yet other embodiments disclosed herein, the AI-enabled nodes in the system may learn to scale, replicate, and transact with each other in an optimized—and fully autonomous—fashion over time. Assuming, as described above, that tokens are used to exchange value for services across the skills exchange, in some embodiments, a given IPA node may be programmed to maximize the number of incoming tokens it receives for the providing of skills and minimize the number of outgoing tokens that it sends for skills to be performed by other IPAs. In such a system, each IPA will evolve towards performing as many of the skills that it is best at in the most efficient way possible and "outsourcing" the skills it performs poorly at to nodes that have the most optimal combination of price and desired performance benchmarking. In other instances, a given IPA node may be seeded with a different "personality" type, e.g., favoring the selection of the lowest cost provider of a service, favoring the selection of the fastest provider of a service, favoring the selection of the most reliable provider of a service, favoring the selection of the highest quality provider of a service, etc.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the terms "system" or "computing system" refer to a single electronic computing device that includes, but is not limited to a single computer, VM, virtual container, host, server, laptop, and/or mobile device, or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Referring now to FIG. 1, a network architecture infrastructure 100 is shown schematically. The infrastructure 100 includes computer networks 110, interaction platform devices 120 (e.g., devices implementing a centralized communications system that allows users' client devices to seamlessly interact with any number of other client or third-party devices via any communications protocol and/or format), client devices 130, third-party communications devices 140, third-party service provider devices 150, smart devices 160, third-party 'API-enabled' services 170, and third-party 'Web-enabled' services 180.

The computer networks 110 may include any communications network that allows computers to exchange data, such as the Internet 111, local area networks 112, corporate networks 113, cellular communications networks 114, etc. Each of the computer networks 110 may operate using any number of network protocols (e.g., TCP/IP). The computer networks 110 may be connected to each other and to the various computing devices described herein (e.g., the interaction platform devices 120, the client devices 130, the third-party communications devices 140, the third-party service provider devices 150, the smart devices 160, the third-party 'API-enabled' services 170, and the third-party 'Web-enabled' services 180) via hardware elements such as gateways and routers.

The interaction platform devices 120 may include one or more servers 121 and one or more storage devices 122. The one or more servers 121 may include any suitable computer hardware and software configured to provide the features disclosed herein. The storage devices 122 may include any tangible computer-readable storage media including, for example, read-only memory (ROM), random-access memory (RAM), magnetic disc storage media, optical storage media, solid state (e.g., flash) memory, etc.

The client devices 130 may include any number of computing devices that enable an end user to access the features disclosed herein. For example, the client devices 130 may include, for example, desktop computers 131, tablet computers 132, mobile phones 133, notebook computers 134, etc.

The third-party communications devices 140 may include email servers such as a GOOGLE® email server (GOOGLE is a registered service mark of Google Inc.), third-party instant message (IM) servers, third-party social network servers such as a FACEBOOK® or TWITTER® server (FACEBOOK is a registered trademark of Facebook, Inc. TWITTER is a registered service mark of Twitter, Inc.), cellular service provider servers that enable the sending and receiving of messages such as email messages, short message service (SMS) text messages, multimedia message service (MMS) messages, or any other device that enables individuals to communicate using any protocol and/or format.

The third-party service devices 150 may include any number of computing devices that enable an end user to request one or more services via network communication. The smart devices 160 may include any number of hardware devices that communicate via any of the computer networks 110 and are capable of being controlled via network communication. The third-party 'API-enabled' services 170 may include any number of services that communicate via any of the computer networks 110 and are capable of being controlled via an Application Programming Interface (API), such as a ride-sharing service. The third-party 'Web-enabled' services 180 may include any number of services that may have no direct third-party interface, other than informational content, e.g., information hosted on a third-party web site or the like, such as a train schedule.

As is described in more detail in commonly-assigned U.S. patent application Ser. No. 14/986,157 ("the '157 application"), the so-called "Universal Interaction Platform" (UIP) and associated service offerings or capabilities provided by platform 120 allow users to interact with individuals, service providers, and smart devices 160 by sending a message (in the form of a message object) from a client device 130. The message object is output by the client device 130 for transmittal to the server 121. When the user is interacting with a service provider, the UIP may format an instruction for the third-party service device 150 associated with the service provider and output the instruction from the server 121 for transmittal to the third-party service device 150. Similarly, when the user is interacting with a smart device 160, the UIP may format an instruction for the smart device 160 and output the instruction from the server 121 for transmittal to the smart device 160. The server 121 may also receive a response from the third-party service device 150 or smart device 160, format a response message (e.g., in the form of a response message object) for the user, and output the response message object for transmittal to the client device 130.

Although platform 120 is described above as being a centralized communications system, the client devices 130 are also capable of communicating with each other in a peer-to-peer fashion, i.e., independent of centralized communications system 120, and/or treating centralized communications system 120 as simply another node in a peer-to-peer network. In some embodiments, one or more instances of an IPA (or even instances of multiple, different IPAs) may be executing on any of the various nodes connected via computer networks 110, e.g., IPAs may be executing on any one or more of the client devices 130, the third-party communications devices 140, the third-party service provider devices 150, and/or the smart devices 160. The IPAs may "belong" to a particular person, individual entity, or the centralized communications system platform 120 itself. The IPAs may be used to perform any nature of computational task or service. In some embodiments, many instances of the same IPA may be running at one time on one or multiple nodes in the network of connected IPAs (also referred to herein as the "skills exchange network"). As will be described in further detail below, the IPAs may be: trainable and improvable over time; deployable across other nodes; "containerizable" to be executed in many different computational environments; AI-enabled for autonomous operation; and/or able to serve other IPAs, preferably in an optimally-efficient manner for the performance of the overall skills exchange network.

Figure 2A:
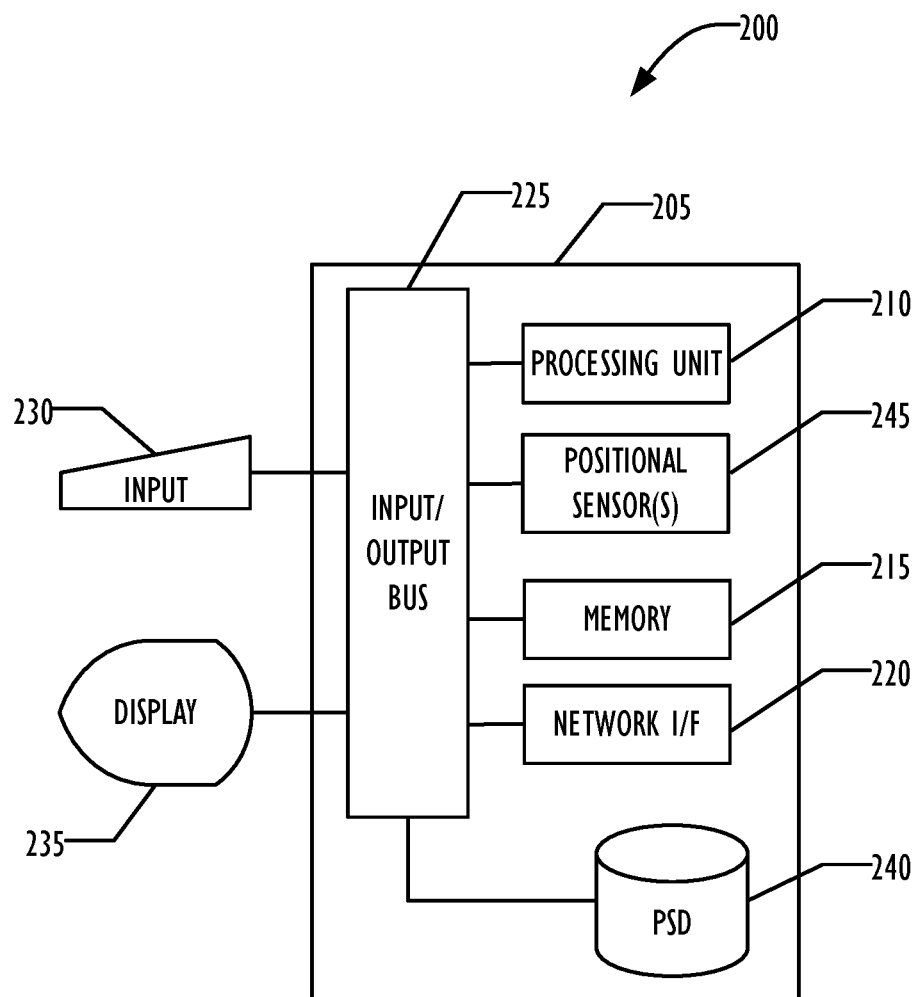
FIG. 2A is a block diagram illustrating a computer which could be used to execute the various processes described herein, according to one or more of disclosed embodiments.

Referring now to FIG. 2A, an example processing device 200 for use in the nodes operating on the skills exchange network described herein, according to one or more embodiments, is illustrated in block diagram form. Processing device 200 may serve in, e.g., a server 121 or a client device 130. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like, and which may be used to track the movement of user client devices.

Figure 2B:
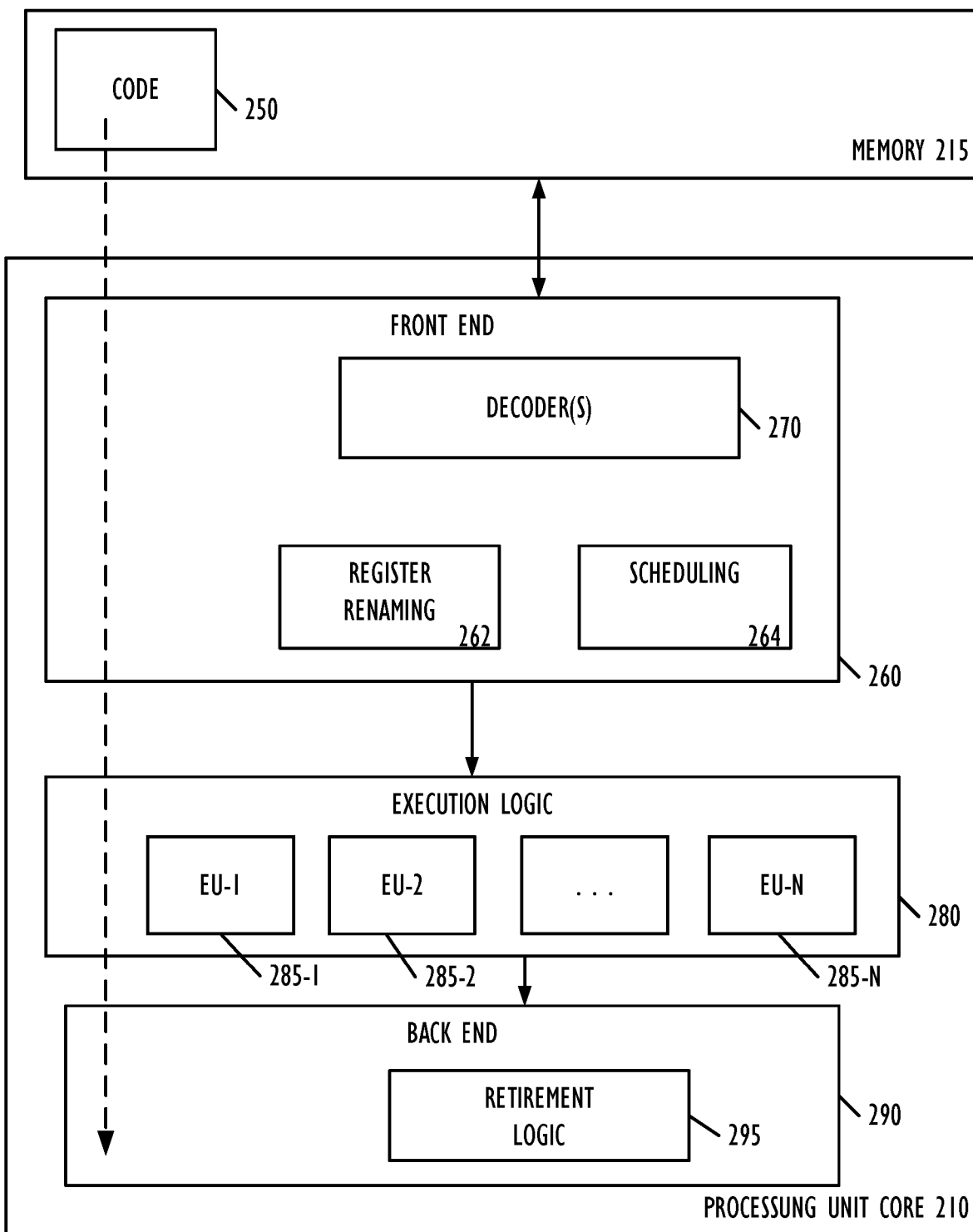
FIG. 2B is a block diagram illustrating a processor core, which may reside on a computer, according to one or more of disclosed embodiments.

Referring now to FIG. 2B, a processing unit core 210 is illustrated in further detail, according to one or more embodiments. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

Exemplary Blockchain Implementation

As mentioned above, blockchain technology provides a platform for secure online transactions via the storage of a decentralized, i.e., distributed, transaction ledger that is stored and replicated many times across many computers (sometimes referred to as "peers") on a network. Blockchains enable a rapid exchange of value for services at network-level latency and with full auditability. Because blockchains operate on the principle of "decentralized consensus," there is no single central authority that could potentially be hacked into by a malicious actor in an attempt to modify or delete any transactions from the recorded transaction ledger. As blockchains grow over time, the computational power that it would require to modify all subsequent blocks downstream from an unauthorized modification would become so great, that it would be infeasible, if not impossible, for any single actor to so modify the chain. Further, even if such a modification was made, the "democratic" consensus of the other peers storing the replicated copies of the blockchain could confirm that the single, modified copy of the blockchain was not valid, since its blocks' hashes would differ from the hashes of the blocks in the "legitimate" copies of the blockchain.

Referring now to FIG. 3, an exemplary implementation of blockchain technology is shown, according to one or more disclosed embodiments. FIG. 3 shows two exemplary blockchains, blockchain $300_1$, stored on exemplary "Peer #1" and blockchain $300_2$, stored on exemplary "Peer #2." Each blockchain 300 may comprise one or more individual blocks 302 of data. [In the example of FIG. 3, six distinct blocks of data are shown (i.e., Blocks A-F). It is to be understood that common elements of each data block share common reference numerals, whereby each reference numeral has been appended with the appropriate block suffix of A-F, depending on which data block the element is a part of.] Blocks 302 may themselves be comprised of multiple components. The components shown in FIG. 3 are merely illustrative, and additional (or fewer) block elements may be used in a given implementation.

According to some embodiments, each block 302 may have a block number 304 that is simply incremented by one each time an additional block is added to the chain. The block number 304 may be used so that each block across the various replications of the blockchain on multiple peers may be referred to by a unique identifier. Each block may also have a nonce 306. The nonce 306 for a given block is an arbitrary number whose value is set so that the hash 312 of the block will contain a run of leading zeros. In the example shown in FIG. 3, the hashes 312 of valid or so-called "signed" blocks begin with a run of four leading zeros.

If a block's data 308 has been modified without subsequently determining a new nonce 306 that will result in a run of four leading zeros again (a process also referred to as "mining"), then the hash 312 of the block will not contain a run of leading zeros, and the block will be considered to be invalid or "unsigned." Since it is not feasible to predict which combination of numbers in a nonce will result in the correct hash for a given set of block data 308, the process of "mining" involves sequentially trying many different nonce 306 values and recomputing the hash 312 for each nonce 306 value until a hash 312 containing the required number of leading zeros is found. The number of leading zeros required in a given blockchain implementation for a block to be considered "signed" is set by the difficulty. Because the calculation of the correct nonce 306 for a given block requires substantial time and resources (both computational and power-wise), the presentation of a block with the correct nonce value to the rest of the world constitutes what is known as "proof of work." Other types of blockchains may operate on different validation principles, such as "proof of burn" or "proof of stake." It is to be understood that, although shown as plaintext for illustrative purposes in FIG. 3, in order to handle blockchains involving very large quantities of content, a block's payload data may actually be stored in the form of a hash tree or Merkle tree, wherein each leaf node is labelled with the hash of a data block, and every non-leaf node is labelled with the cryptographic hash of the labels of its child nodes.

Blocks 302 may also comprise a timestamp field 314 that may be used to track the moment in time at which the block was created, modified, or became signed. Timestamping may be used to securely track the creation and/or modification of a block over time. According to some embodiments, no entity within the network—not even the entity that mined the nonce for the block—should be able to change the block once it has been officially signed and added to the blockchain.

Each block 302 may also contain a hash pointer 310 to the hash of the previous block 302 in the blockchain 300. In this manner, the blockchain 300 effectively becomes a singly-linked list data structure, wherein each block only knows the identity of its preceding block in the overall linked list. Note that the previous hash pointer 310 for the first block in a blockchain may be set to all zeros or any specific set of digits, since there is no previous block to the first block in the chain.

In a system where all blocks are valid and all replicated copies of the blockchain are identical, the hash 312 of each block should begin with the aforementioned leading zeros, and the previous hash pointer 310 of each block 302 should match the hash 312 of the preceding block in the chain, as is shown by dashed-line arrows 320 in FIG. 3. However, if a modification has been made to any of the blocks in a particular instance of the chain, as is shown in Block E (302E) in FIG. 3, with respect to the timestamp data field 316 and the block data field 318, the computed hash (312E) using the existing nonce 306E will no longer hash to a value with the requisite number of leading zeros, thus indicating that the block is "unsigned." As further indicated by icon 322, this will also cause a situation wherein the previous hash pointer 310F of the next block in the chain (block 302F, in this example) will not match the previous hash pointer 310C of the corresponding Block #3's in all other replications of the chain, and will also cause the hash (e.g., 312F) of all subsequent blocks in the chain to become "unsigned," thereby indicating that a modification has been made somewhere earlier in the blockchain.

Even assuming that a malicious user was able to "remine," i.e., determine a new nonce, for the modified block and all subsequent blocks in the chain that would cause them to appear as "signed" blocks, the hash values in the compromised blockchain (i.e., blockchain $300_2$ stored on Peer #2 in the example of FIG. 3) would not match the hashes for the corresponding blocks in any of the other replicated copies of the blockchain, e.g., the blockchains stored on Peer #1, Peer #3, Peer #4, and so forth—thus indicating that the blockchain stored on Peer #2 does not contain a valid copy of the historical transaction ledger for this particular blockchain 300. Thus, in the example of FIG. 3, the nodes on the skills exchanges network would come to the decentralized consensus conclusion that Sarah, in fact, had only received 85 ENTs (i.e., a hypothetical token used to exchange value on an AI-driven skills exchange network, also represented by the symbol e' herein) to date, as opposed to the 585 ENTs reflected in the modified ledger of blockchain $300_2$ stored on Peer #2.

A Decentralized AI-Driven Economy for Skills Exchange

Figure 4A:
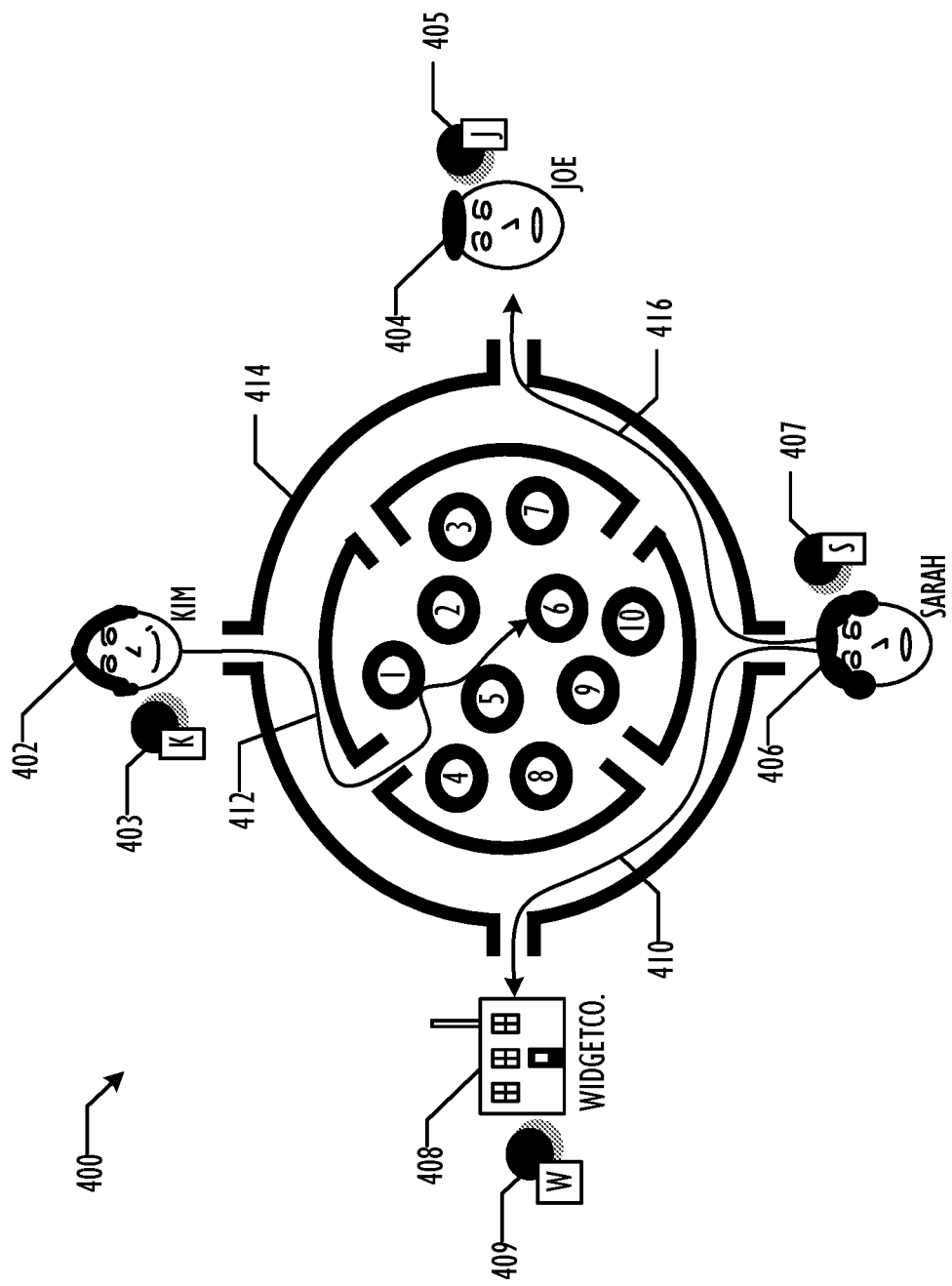
FIG. 4A illustrates a model of an exemplary AI-enabled skills exchange network, according to one or more disclosed embodiments.

Referring now to FIG. 4A, a model of an exemplary AI-enabled skills exchange network 400 is shown, according to one or more disclosed embodiments. The skills exchange network 400 may comprise various human user entities, such as Kim (402), Joe (404), and Sarah (406), in the example of FIG. 4A. The skills exchange network 400 may further comprise various other entities, such as corporations, e.g., WidgetCo (408) or other computational service providers that are not managed exclusively by individual human users. Each entity that is part of or participating in the skills exchange network 400 may also be executing one or more instances of an IPA. As mentioned above, an IPA may be thought of as a computational "container" for certain functionalities. IPAs according to the embodiments disclosed herein may be scaled, replicated (i.e., run as multiple instances of the same container), trained, and optimized to transact with other IPAs.

As shown in FIG. 4A, user Kim (402) is running an instance of her personalized IPA (403) that is labeled with a 'K' icon; user Joe (404) is running an instance of his personalized IPA (405) that is labeled with a 'J' icon; and user Sarah (406) is running an instance of her personalized IPA (407) that is labeled with an 'S' icon. Each user's IPA is said to be personalized because it may have been trained, enhanced, or modified over time with particular skills by its respective "owner." Likewise, corporate entity WidgetCo (408) is running an instance of its corporate IPA (409) that is labeled with a 'W' icon. The corporate IPA (409) may have been trained and provided with a wider variety of (or more specialized) skills than the average individual user on the skills exchange network 400, but there could also exist particular skills that individual users are able to perform better (or cheaper) than WidgetCo (408)'s corporate IPA (409), for a variety of reasons.

Network transaction queue 414 in FIG. 4A represents a conceptual illustration of a processing queue for the various services and skills requested (as well as the skills made available) via the skills exchange network 400 described above, e.g., via publication to the network. In this example, the provider of a centralized communications system having a UIP (e.g., such as centralized communications system implemented by devices 120 in FIG. 1) has published ten of its own services/skills to the skills exchange network, as represented by the ten circular icons within network transaction queue 414, labeled with the numbers '1' through '10' to represent the various services made available to individual and corporate entities of the skills exchange network 400 by the centralized communications system. As may now be more clearly understood, sometimes, when an individual user wants a particular service or skill performed for it, it may directly pay a corporate IPA for such services or skill performance, as is shown by path 410 within the skills exchange network 400. In the case of path 410, user Sarah (406)'s IPA (407) has requested the performance of a service or skill by corporate entity WidgetCo (408), which will be executed by one or more instances of its corporate IPA (409). In other examples, an individual user who wants a particular service or skill performed for it may directly pay another individual user on the skills exchange network for the performance of such services or skills (e.g., as shown by path 416, user Sarah (406) could directly pay user Joe (404)). In still other examples, an individual user of skills exchange network 400 (or that user's IPA, on its user's behalf) may go out into the marketplace of the "skills exchange" to identify one or more so-called "native" UIP services and skills provided by a centralized communications system (e.g., such as the system described as being implemented by devices 120 in FIG. 1) that are able to satisfactorily meet the processing needs of the user's desired workload. The desired workload may then be performed by the UIP's native services and skills, in a determined sequence, and in exchange for an agreed price for the performance of the respective services. For example, in the case of path 412, user Kim (402)'s IPA (403) has requested the performance of service(s) or skill(s) that it has been determined may be performed in a most optimally-efficient fashion, e.g., in a sequential order, by the UIP's native skill '1' and then skill '5,' and, finally, skill '6.' At each step along path 412, the agreed upon cost may be transferred to the 'owner' of the respective entity performing a service or skill (in this case, the owner or sponsor of the UIP) and then recorded in a transaction ledger, e.g., a transaction ledger that is stored in a secure, auditable, and decentralized blockchain, as discussed above. It is to be understood that the centralized communications system's native UIP may not provide all of skills listed on the skills exchange network and, in some cases, individual users or corporate entities may develop different skills and/or complementary or competing skills to those native skills offered by the UIP, which complimentary or competing skills may potentially be offered: at a different price point, with a different performance benchmark; and/or with a different availability benchmark. In some cases, an IPA may determine that its desired workload may be performed entirely by skills provided natively by the UIP sponsor. In other cases, an IPA may determine it is most efficient to mix and match from skills provided by other users (e.g., individual or corporate) of the skills exchange network and the native UIP skills offered on the skills exchange network, in order to perform its desired workload.

Referring now to FIG. 4B, an exemplary skills registry 420 for an AI-enabled skills exchange network is shown, according to one or more disclosed embodiments. As mentioned above, according to some embodiments of a skills exchange network, a skills registry 420 may be published to the skills exchange network 400. The skills registry 420 may comprise a listing of various attributes for every skill offered on the skills exchange network 400, e.g., a unique service identifier (422) to distinguish services on the registry from one another; a function identifier (424) to uniquely identify, in a standardized fashion, the type of skill or service that is being offered; one or more standardized performance benchmarks for a particular skill (e.g., 10 photos analyzed per minute, accuracy of 99.7%, etc.) (426); network availability levels (historical and/or current) (428) for a particular skill or service; and the cost per unit (430) for a particular node to perform the particular skill or service that it has advertised to the skills registry. The skills registry 420 may be stored at a single, centralized trusted source, or, in other implementations, it may also be stored across multiple nodes on the exchange, i.e., in a decentralized fashion. Skills registry 420 may also be stored in blockchain, or other decentralized consensus format, to ensure the validity and auditability of skills offered in the network over time.

Examples of skills offered by nodes on the network may include, e.g.: performing object or face recognition tasks on photos (as is represented in skills registry 420 by exemplary Function_ID 0112 and offered by service listing 432 from Joe, 438 from Kim, and 440 from WidgetCo); performing object or face recognition tasks on videos (as is represented in skills registry 420 by exemplary Function_ID 0116 and offered by service listing 434 from WidgetCo and 442 from Joe); summarizing the contents of a document (as is represented in skills registry 420 by exemplary Function_ID 0237 and offered by service listing 436 from WidgetCo; predicting the future price of a particular stock (as is represented in skills registry 420 by exemplary Function_ID 0345 and offered by service listing 444 from Sarah); or even passive skills, such as offering storage space for files of any kind to other nodes on the network (as is represented in skills registry 420 by exemplary Function_ID 0817 and offered by service listing 446 from Sarah). As may now be understood, many additional rows may exist in skills registry 420 (including rows relating to skills offered natively by the UIP's owner or sponsor, as discussed above with reference to FIG. 4A), and the values of particular service listings may change over time, e.g., as performance benchmarks improve (or worsen), network availability increases (or decreases), and/or as the cost of performing the particular skill changes, e.g., in response to market forces or changes in the abilities of a node to perform the skill over time. The costs of the services on exemplary skills registry 420 in column 430 are shown in 'ents,' a hypothetical token for exchanging value among the members of the skills exchange network 400. As mentioned above, the value of the token used by the network may also be tied to another monetary asset, such as a more traditional state-sponsored currency, e.g., the U.S. dollar, or another form of digital currency or decentralized cryptocurrency, e.g., bitcoins, such that 'real world' value may be exchanged between IPAs via the skills exchange network 400.

Referring now to FIG. 4C, an exemplary transaction ledger 460 for an AI-enabled skills exchange network is shown, according to one or more disclosed embodiments. As mentioned above, according to some embodiments of a skills exchange network, a secure transaction ledger may be maintained that provides a record of all transactions performed across the network in a tamper-proof and auditable fashion, e.g., via the use of blockchain or other decentralized consensus-based technologies. By storing the database in a decentralized fashion, no single trusted copy of the transaction ledger exists, and no single user/node is trusted more than the other nodes in the network. In such a system, a given record in the transaction ledger cannot be changed or altered retroactively without the alteration of all subsequent blocks in the blockchain, as well as the consensus of more than 51% of the network peers (by computational power) storing replicated copies of the blockchain. This ensures the validity and auditability of the recorded network transactions, and allows nodes to validate and verify that another node has sufficient tokens to pay for the service(s) that they are requesting.

The transaction ledger 460 may comprise a listing of various attributes for every transaction that has taken place on the skills exchange network 400, e.g., a transaction identifier (462) to uniquely identify every transaction that has taken place on the exchange; a function identifier (464) to uniquely identify, in a standardized fashion, the type of skill or service that was completed during the transaction; the party providing the service or skill sold in the transaction (466); the party receiving the service or skill sold in the transaction (468); the price paid for the performance of the transaction (470); and a timestamp (472) indicating when the transaction occurred. According to some embodiments, the timestamp may reflect the instant in time at which a smart contract was agreed to or executed between the provider of the service and the receiver of the service. As may now be understood, many additional rows may exist in the transaction ledger 460, and the ledger will continue to increase over time as more and more transactions are transacted in the network, adding more and more blocks to the transaction ledger blockchain (assuming that one is being used to store transactional data).

Figure 5:
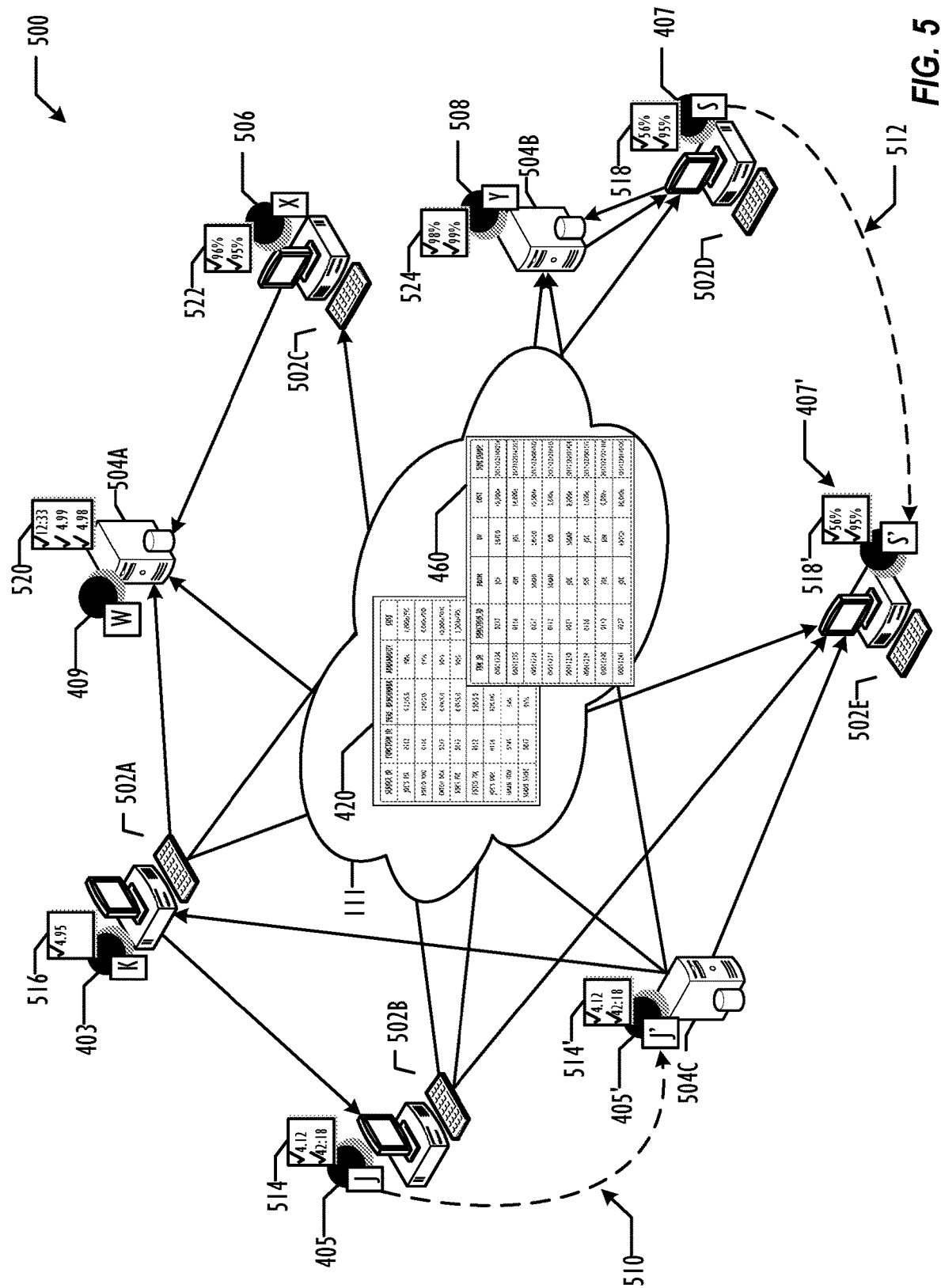
FIG. 5 is a block diagram of an exemplary AI-enabled skills exchange network, according to one or more disclosed embodiments.

Referring now to FIG. 5, a block diagram of an exemplary AI-enabled skills exchange network 500 is shown, according to one or more disclosed embodiments. FIG. 5 reflects an exemplary real-world instantiation of skills exchange network 400 that is "in motion," with the various nodes transacting across the network with various other nodes, in order to have their desired services performed in an optimally-efficient manner. Skills exchange network 500 is also shown as operating in a decentralized fashion, e.g., over the Internet 111 (or other network backbone), and leveraging the aforementioned skills registry 420 from FIG. 4B and transaction ledger 460 from FIG. 4C to facilitate and track transactions across the network, respectively.

Exemplary skills exchange network 500 is comprised of various physical hardware instances, e.g., end-user computing devices 502A-502E and server devices 504A-504C. Of course, many other types of physical instances may comprise part of skills exchange network 500, and those shown in FIG. 5 are merely illustrative in nature.

Each device 502/504 that is part of skills exchange network 500 is also shown as executing at least one benchmarked IPA. For example, device 502A is executing Kim's IPA 403, having benchmark scores 516; device 502B is executing Joe's IPA 405, having benchmark scores 514; device 502C is executing a Party 'X's IPA 506, having benchmark scores 522; device 502D is executing Sarah's IPA 407, having benchmark scores 518; device 502E is executing a "replicated" version of Sarah's IPA 407', having benchmark scores 518'; device 504A is executing WidgetCo's corporate IPA 409, having benchmark scores 520; device 504B is executing a Party 'Y's IPA 508, having benchmark scores 524; and device 504C is executing a replicated version of Joe's IPA 405', having benchmark scores 514'. In some implementations, Party 'Y,' executing an IPA 508 on device 504B could, for example, represent the native UIP services and skills provided by a centralized communications system (e.g., such as the system described as being implemented by devices 120 in FIG. 1).

As is shown in FIG. 5, each device, via at least one of the IPA instances that is being executed on it, may request the performance of one or more services from one or more other IPAs in the skills exchange network 500. The reasons for the various transactions may be varied, and may be as simple as the fact that a particular IPA does not have the capability to perform a particular skill (e.g., Kim's IPA may request Joe's IPA to perform object recognition in one or more video files because Kim's IPA does not have that skill) or that another node in the system can perform a particular skill at a greater quality level or for a cheaper cost (e.g., Kim's IPA may request WidgetCo's corporate IPA to perform object recognition in one or more picture files, due to WidgetCo's better benchmarking score, higher availability, and/or lower per picture file cost). If, at some future time, the best-performing IPA for a particular skill becomes too busy or suffers from availability issues (e.g., as reported via the skills registry), a given node may instead look to the second-best performing or third-best performing IPA in the network to perform the particular skill, as it is willing to take a decrease in performance quality in exchange for getting the job completed more quickly and/or reliably.

Over time, the various nodes may learn, via one or more AI methodologies, which other nodes in the system to transact with in order to complete computational tasks in the most efficient manner. In some embodiments, these decisions may be fully autonomous, i.e., free from end user input. As shown in FIG. 5 via dashed-line arrows 510/512, in some instances, the most optimal decision for a node may be to effectively clone or replicate itself to be executed on another physical instance in the network, e.g., a physical instance with greater processing power or capacity, which is able to share a computational workload with the originating node. Further, although not illustrated in FIG. 5, as mentioned above, multiple instances of a particular IPA (or single instances of multiple, different IPAs) may each be executing simultaneously on the same physical instance in the network.

Figure 6A:
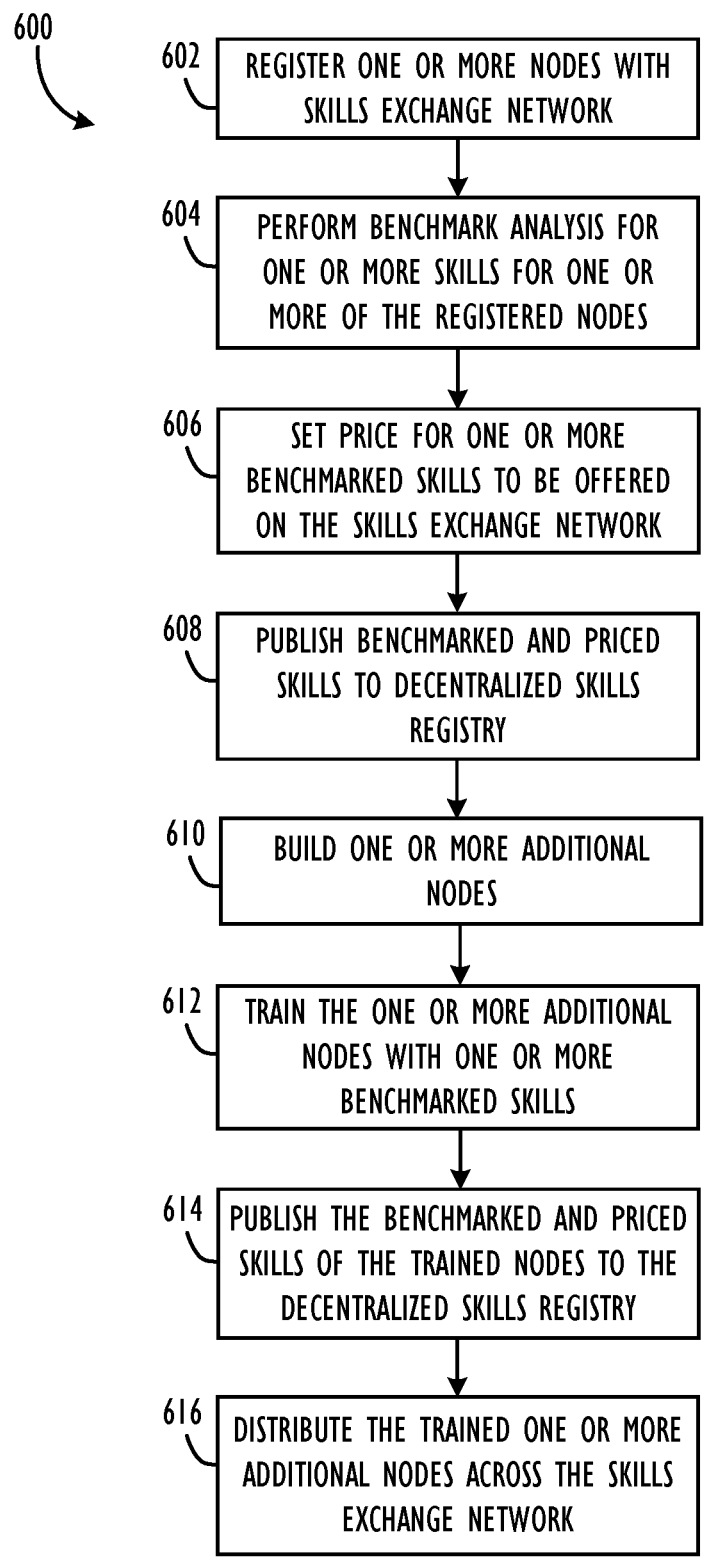
FIG. 6A shows a flowchart for a method of establishing an AI-enabled skills exchange network, according to one or more disclosed embodiments.

Referring now to FIG. 6A, a flowchart 600 for a method of establishing an AI-enabled skills exchange network is shown, according to one or more disclosed embodiments. First, the method 600 may register one or more nodes with the skills exchange network (Step 602). By making themselves known to the network, the nodes may begin the process to become allowed to list their skills and transact with other nodes on the network. Next, at Step 604, a benchmark analysis may be performed on one or more of the skills that one or more of the nodes wishes to offer. As mentioned above, benchmarks may be in the form of a rating, e.g., a user rating, a throughput speed, a percentage success rate, a compression ratio, a quantity, etc. Importantly, benchmarks can allow IPAs (and/or the entities directing such IPAs) to compare the quality and cost of comparable service offerings across the entire skills exchange network at network-level latency speeds.

Next, at Step 606, the method 600 may set the price for one or more of the benchmarked skills from Step 604 that is to be offered on the skills exchange network. Once the necessary benchmarks and price points have been determined for a given skill, it may be published to a registry (Step 608).

Over time, entities on the skills exchange network may decide that they want to build, replicate, or deploy one or more additional nodes (Step 610). For example, if user Joe becomes particularly well-known across the skills exchange network for his highly-accurate image facial recognition algorithm, he may wish to deploy additional IPAs offering the highly-desired facial recognition service on more compute nodes throughout the blockchain network. Once the additional nodes have been built, they may be trained up with the service or skill in question (Step 612) and then likewise benchmarked, priced, and published to the skills registry (Step 614). The additional trained nodes may be executed either on Joe's own physical hardware instances, or distributed across the network (Step 616), e.g., by renting out time and/or computational cycles on another entity's physical hardware instances to execute Joe's facial recognition-specializing IPA. In some embodiments, the user's allowing Joe to rent out time on their physical instances may receive some percentage of the tokens that Joe receives for performing the image recognition services on their physical instances.

Figure 6B:
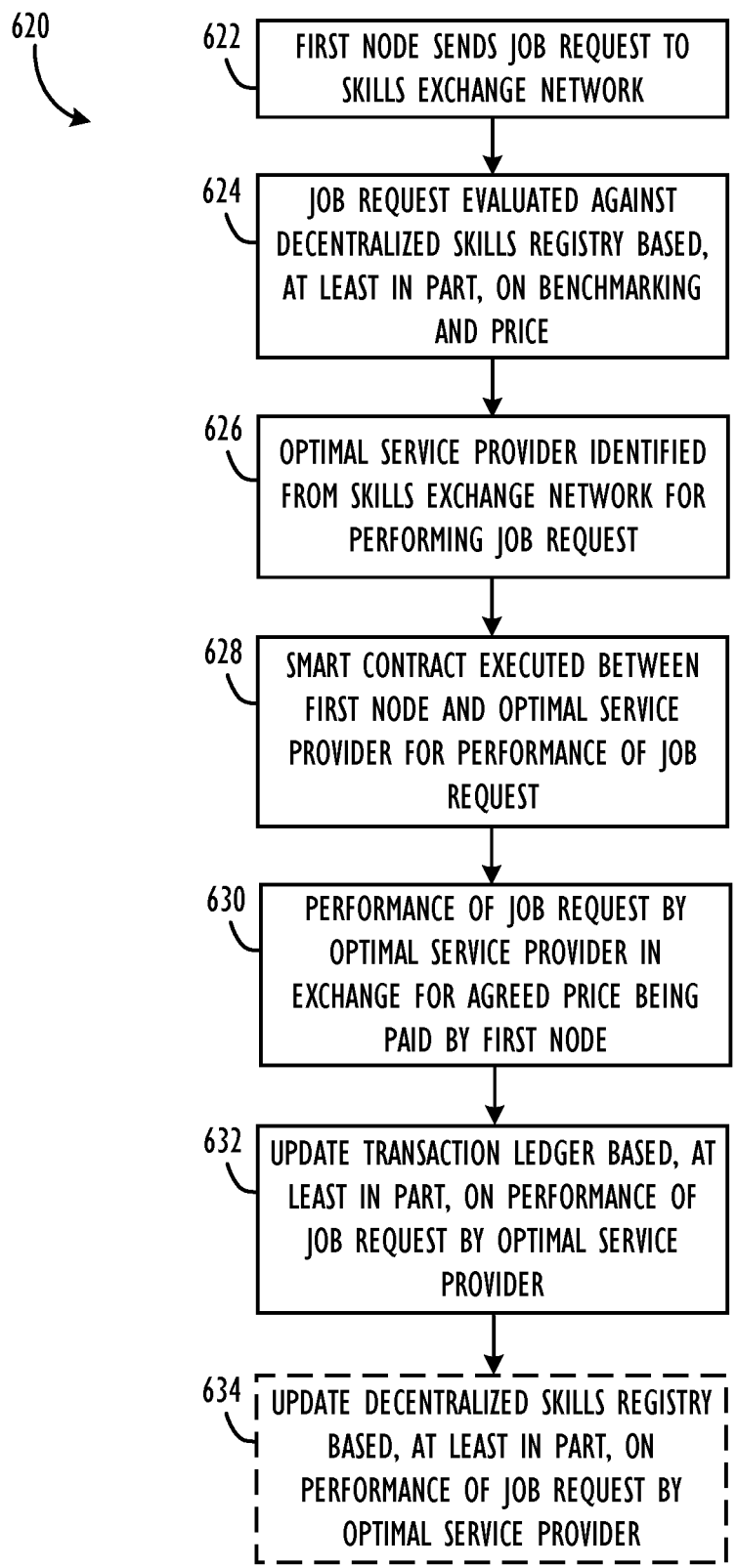
FIG. 6B shows a flowchart for a method of maintaining an AI-enabled skills exchange network having a skills registry and secure transaction ledger, according to one or more disclosed embodiments.

Referring now to FIG. 6B, a flowchart 620 for a method of maintaining an AI-enabled skills exchange network having a skills registry and secure transaction ledger is shown, according to one or more disclosed embodiments. First, method 620 may begin with a first node sending a job request to a skills exchange network (Step 622). The "job request" may comprise a computational task to be performed by one or more services offered via the skills exchange network, wherein the one or more services may be performed by one or more IPAs instances, controlled by one or more entities, operating on one or more physical instances distributed across the skills exchange network.

At Step 624, the job request may be evaluated against a decentralized skill registry, wherein the determination of the most optimal performance of the job request may be based, at least in part, on the benchmarking scores and prices of the various skills offered on the skills registry. At Step 626, the optimal service provider (or providers) for performing the job request are identified on the skills exchange network. At Step 628, a smart contract may be executed between the first node and the optimal service provider(s) for the performance of the job request. Finally, at Step 630, the job request may be performed by the optimal service provider(s), in exchange for the agreed upon price from the skills registry being paid by the first node.

According to some preferred embodiments, a transaction ledger may then be updated based, at least in part, on the performance of the job request by the optimal service provider(s) (Step 632), and the skills registry may, if necessary, be updated based, at least in part, on the performance of the job request by the optimal service provider(s) (Step 634). For example, if the service provider's quality level has decreased over a significant number of job performances, the service provider's benchmark listing in the service registry may be updated to reflect a lower benchmarking score. Likewise, if demand has gone up (or down) over a significant amount of time, the cost of the service provider's listing in the service registry may be updated to reflect a the greater (or lower) demand level across the network, etc.

As mentioned above, the decisions about job routing may occur across the entire skills exchange network at network-level latency speeds, and individual nodes within the network may be programmed and/or trained up, e.g., using various algorithms, human training, software development, data mining, etc., to transact autonomously with the rest of the skills exchange network in the most optimally-efficient manner.

EXAMPLES

The following examples pertain to further embodiments.
Example 1 is a computer-implemented method, comprising: registering a first node with a skills exchange network, wherein the first node is executing at least one Intelligent Personal Assistant (IPA) applications, and wherein a first IPA application of the at least one IPA applications is configured to perform at least a first skill; performing a benchmarking analysis on the first skill; determining a price for the performance of the first skill by the first IPA application; publishing the benchmarking analysis and price for the performance of the first skill by the first IPA application to a first skills registry accessible by nodes in the skills exchange network; receiving, at the first IPA application, a request from a second IPA application for the performance of the first skill; executing a smart contract between the first IPA and the second IPA for the performance of the first skill at the determined price; performing, by the first IPA application, the first skill; receiving, by the first IPA application, payment of the determined price from the second IPA application; and recording the performance of the first skill, by the first IPA application, for the second IPA application, and at the determined price, in a transaction ledger accessible by nodes in the skills exchange network.

Example 2 includes the subject matter of example 1, wherein the benchmarking analysis further comprises at least one of the following: a rating, a user rating, a throughput speed, a percentage success rate, a compression ratio, and a quantity.

Example 3 includes the subject matter of example 1, further comprising: publishing an availability rating for the performance of the first skill by the first IPA application to the first skills registry.

Example 4 includes the subject matter of example 1, wherein the second IPA application has determined that the first IPA application is the optimally-efficient IPA application that is accessible by nodes in the skills exchange network for the performance of the first skill at the time the request is made.

Example 5 includes the subject matter of example 1, wherein receiving payment of the determined price further comprises receiving a payment made using at least one of the following: a token asset, a cryptocurrency asset, a digital currency asset.

Example 6 includes the subject matter of example 1, wherein the transaction ledger is stored in a blockchain.

Example 7 includes the subject matter of example 1, further comprising: updating the first skills registry based, at least in part, on the performance of the first skill.

Example 8 includes the subject matter of example 1, further comprising: replicating the first IPA application on a second node within the skills exchange network.

Example 9 is a non-transitory computer readable storage medium comprising computer executable instructions stored thereon to cause one or more processing units to: register a first node with a skills exchange network, wherein the first node is executing at least one Intelligent Personal Assistant (IPA) applications, and wherein a first IPA application of the at least one IPA applications is configured to perform at least a first skill; perform a benchmarking analysis on the first skill; determine a price for the performance of the first skill by the first IPA application; publish the benchmarking analysis and price for the performance of the first skill by the first IPA application to a first skills registry accessible by nodes in the skills exchange network; receive, at the first IPA application, a request from a second IPA application for the performance of the first skill; execute a smart contract between the first IPA and the second IPA for the performance of the first skill at the determined price; perform, by the first IPA application, the first skill; receive, by the first IPA application, payment of the determined price from the second IPA application; and record the performance of the first skill, by the first IPA application, for the second IPA application, and at the determined price, in a transaction ledger accessible by nodes in the skills exchange network.

Example 10 includes the subject matter of example 9, wherein the benchmarking analysis further comprises at least one of the following: a rating, a user rating, a throughput speed, a percentage success rate, a compression ratio, and a quantity.

Example 11 includes the subject matter of example 9, further comprising instructions stored thereon to cause the one or more processing units to: publish an availability rating for the performance of the first skill by the first IPA application to the first skills registry.

Example 12 includes the subject matter of example 9, wherein the second IPA application has determined that the first IPA application is the optimally-efficient IPA application that is accessible by nodes in the skills exchange network for the performance of the first skill at the time the request is made.

Example 13 includes the subject matter of example 9, wherein the instructions to receive payment of the determined price further comprise instructions to receive a payment made using at least one of the following: a token asset, a cryptocurrency asset, a digital currency asset.

Example 14 includes the subject matter of example 9, wherein the transaction ledger is stored in a blockchain.

Example 15 includes the subject matter of example 9, further comprising instructions stored thereon to cause the one or more processing units to: update the first skills registry based, at least in part, on the performance of the first skill.

Example 16 includes the subject matter of example 9, further comprising instructions stored thereon to cause the one or more processing units to: replicate the first IPA application on a second node within the skills exchange network.

Example 17 is Intelligent Personal Assistant (IPA)-enabled system, comprising: a memory; and one or more processing units, communicatively coupled to the memory, wherein the memory stores instructions configured to cause the one or more processing units to: register the IPA-enabled system as a first node with a skills exchange network, wherein the IPA-enabled system is executing at least one IPA applications, and wherein a first IPA application of the at least one IPA applications is configured to perform at least a first skill; perform a benchmarking analysis on the first skill; determine a price for the performance of the first skill by the first IPA application; publish the benchmarking analysis and price for the performance of the first skill by the first IPA application to a first skills registry accessible by nodes in the skills exchange network; receive, at the first IPA application, a request from a second IPA application for the performance of the first skill; execute a smart contract between the first IPA and the second IPA for the performance of the first skill at the determined price; perform, by the first IPA application, the first skill; receive, by the first IPA application, payment of the determined price from the second IPA application; and record the performance of the first skill, by the first IPA application, for the second IPA application, and at the determined price, in a transaction ledger accessible by nodes in the skills exchange network.

Example 18 includes the subject matter of example 17, wherein the benchmarking analysis further comprises at least one of the following: a rating, a user rating, a throughput speed, a percentage success rate, a compression ratio, and a quantity.

Example 19 includes the subject matter of example 17, wherein the instructions are further configured to cause the one or more processing units to: publish an availability rating for the performance of the first skill by the first IPA application to the first skills registry.

Example 20 includes the subject matter of example 17, wherein the second IPA application has determined that the first IPA application is the optimally-efficient IPA application that is accessible by nodes in the skills exchange network for the performance of the first skill at the time the request is made.

Example 21 includes the subject matter of example 17, wherein the instructions to receive payment of the determined price further comprise instructions to receive a payment made using at least one of the following: a token asset, a cryptocurrency asset, a digital currency asset.

Example 22 includes the subject matter of example 17, wherein the transaction ledger is stored in a blockchain.

Example 23 includes the subject matter of example 17, wherein the instructions are further configured to cause the one or more processing units to: update the first skills registry based, at least in part, on the performance of the first skill.

Example 24 includes the subject matter of example 17, wherein the instructions are further configured to cause the one or more processing units to: replicate the first IPA application on a second node within the skills exchange network.

Example 25 includes the subject matter of example 17, wherein the first skills registry comprises a decentralized skills registry.

It is to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled.

What is claimed is:

1. A computer-implemented method for Intelligent Personal Assistant (IPA) applications, comprising:
  receiving a request for a performance of a first computational skill using a network comprising a plurality of IPA nodes, wherein each of the plurality of IPA nodes are configured to execute at least one IPA application for at least a portion of computational skills available on the network, and wherein the network further comprises an artificial intelligence (AI) computational environment that autonomously selects one or more of the plurality of IPA nodes when performing each of the computational skills based on a efficiency processing benchmark;
  determining benchmark scores and node availability for each of the plurality of IPA nodes;
  determining a computational efficiency of each of the plurality of IPA nodes in performing the first computational skill using the at least one IPA application executing on the one of more of the plurality of IPA nodes;
  performing a benchmarking analysis of the first computational skill on each of the plurality of IPA nodes based at least on the computational efficiency, wherein the benchmarking analysis comprises at least one computational rating required for a performance of the first computational skill using the network;

selecting, by the AI computational environment, a first IPA application and a second IPA application based on the benchmark scores, the node availability, and the benchmarking analysis;

establishing a smart contract between the first IPA application and the second IPA application for performing the first computational skill at a set processing rate; and performing, by the first IPA application and the second IPA application, the first computational skill using at least one of the plurality of IPA nodes based on the smart contract.

2. The computer-implemented method of claim 1, wherein the selecting the first IPA application and the second IPA application comprises:

selecting, by the AI computational environment, a first node of the plurality of IPA nodes for the first IPA application and a second node of the plurality of IPA nodes for the second IPA application based on the benchmark scores, the node availability, and the benchmarking analysis, wherein the selecting the first node and the second nodes is based on a efficiency type of processing of the first computational skill selected by the AI computational environment for the efficiency processing benchmark.

3. The computer-implemented method of claim 2, further comprising:

learning, by the AI computational environment, at least one IPA task improvement for at least one of the first node or the second node based on performing the first computational skill;

updating the at least one of the first node or the second node based on the learning; and updating a skills registry based on the updated at least one of the first node or the second node.

4. The computer-implemented method of claim 3, wherein the learning the at least one IPA task improvement comprises determining to outsource at least a portion of the first computational skill between the first node and the second node based on one of a lowest cost provider, a fastest service provider, a most reliable provider or a highest quality provider.

5. The computer-implemented method of claim 1, further comprising:

recording the performing of the first computational skill, by at least one of the first IPA application or the second IPA application, at a determined price in a transaction ledger accessible by the plurality of IPA nodes in the network.

6. The computer-implemented method of claim 1, wherein the selecting the first IPA application and the second IPA application comprises:

determining, by the AI computational environment, that the second IPA application provides the efficiency processing benchmark for a portion of the first computational skill;

selecting, by the AI computational environment, the first IPA application for another portion of the first computational skill; and selecting, by the AI computational environment, the second IPA application to outsource the portion of the first computational skill at a determined price for the network.

7. The computer-implemented method of claim 6, wherein the determined price comprises one of an agreed price between a first node corresponding to the first IPA application and a second node corresponding to the second IPA application, a set price by the second node, or a historically determined price associated with the portion of the first computational skill performed by at least one of the second node or one or more other nodes of the plurality of IPA nodes.

8. The computer-implemented method of claim 1, wherein the benchmark scores for each of the plurality of IPA nodes comprises at least one of a hardware rating, a user rating, a throughput speed, a percentage success rate, a compression ratio, or a network transaction queue.

9. A system for Intelligent Personal Assistant (IPA) applications, comprising:

one or more non-transitory memory devices; and one or more hardware processors configured to execute instructions from the one or more non-transitory memory devices to cause the system to perform operations comprising:

receiving a request for a performance of a first computational skill using a network comprising a plurality of IPA nodes, wherein each of the plurality of IPA nodes are configured to execute at least one IPA application for at least a portion of computational skills available on the network, and wherein the network further comprises an artificial intelligence (AI) computational environment that autonomously selects one or more of the plurality of IPA nodes when performing each of the computational skills based on a efficiency processing benchmark;

determining benchmark scores and node availability for each of the plurality of IPA nodes;

determining a computational efficiency of each of the plurality of IPA nodes in performing the first computational skill using the at least one IPA application executing on the one of more of the plurality of IPA nodes;

performing a benchmarking analysis of the first computational skill on each of the plurality of IPA nodes based at least one the computational efficiency, wherein the benchmarking analysis comprises at least one computational rating required for a performance of the first computational skill using the network;

selecting a first IPA application and a second IPA application based on the benchmark scores, the node availability, and the benchmarking analysis;

establishing a smart contract between the first IPA application and the second IPA application for performing the first computational skill at a set processing rate; and performing, by the first IPA application and the second IPA application, the first computational skill using at least one of the plurality of IPA nodes based on the smart contract.

10. The system of claim 9, wherein the selecting the first IPA application and the second IPA application comprises:

selecting, by the AI computational environment, a first node of the plurality of IPA nodes for the first IPA application and a second node of the plurality of IPA nodes for the second IPA application based on the benchmark scores, the node availability, and the benchmarking analysis, wherein the selecting the first node and the second nodes is based on a efficiency type of processing of the first computational skill selected by the AI computational environment for the efficiency processing benchmark.

11. The system of claim 10, wherein the operations further comprise:
   learning, by the AI computational environment, at least one IPA task improvement for at least one of the first node or the second node based performing the first computational skill;
   updating the at least one of the first node or the second node based on the learning; and
   updating a skills registry based on the updated at least one of the first node or the second node.

12. The system of claim 11, wherein the learning the at least one IPA task improvement comprises determining to outsource at least a portion of the first computational skill between the first node and the second node based on one of a lowest cost provider, a fastest service provider, a most reliable provider or a highest quality provider.

13. The system of claim 9, wherein the operations further comprise:
   recording the performing of the first computational skill, by at least one of the first IPA application or the second IPA application, at a determined price in a transaction ledger accessible by the plurality of IPA nodes in the network.

14. The system of claim 9, wherein the selecting the first IPA application and the second IPA application comprises:
   determining, by the AI computational environment, that the second IPA application provides the efficiency processing benchmark for a portion of the first computational skill;
   selecting, by the AI computational environment, the first IPA application for another portion of the first computational skill; and
   selecting, by the AI computational environment, the second IPA application to outsource the portion of the first computational skill at a determined price for the network.

15. The system of claim 14, wherein the determined price comprises one of an agreed price between a first node corresponding to the first IPA application and a second node corresponding to the second IPA application, a set price by the second node, or a historically determined price associated with the portion of the first computational skill performed by at least one of the second node or one or more other nodes of the plurality of IPA nodes.

16. The system of claim 9, wherein the benchmark scores for each of the plurality of IPA nodes comprises at least one of a hardware rating, a user rating, a throughput speed, a percentage success rate, a compression ratio, or a network transaction queue.

17. A non-transitory machine-readable medium, on which are stored instructions for Intelligent Personal Assistant (IPA) applications, comprising instructions that when executed cause a machine to perform operations comprising:
   receiving a request for a performance of a first computational skill using a skills exchange network comprising a plurality of IPA nodes, wherein each of the plurality of IPA nodes are configured to execute at least one IPA application for at least a portion of computational skills available on the skills exchange network, and wherein the skills exchange network comprises an artificial intelligence (AI) computational environment that autonomously selects one or more of the plurality of IPA nodes when performing each of the computational skills based on a efficiency processing benchmark;
   determining benchmark scores and node availability for each of the plurality of IPA nodes;
   determining a computational efficiency of each of the plurality of IPA nodes in performing the first computational skill using the at least one IPA application executing on the one of more of the plurality of IPA nodes;
   performing a benchmarking analysis of the first computational skill on each of the plurality of IPA nodes based at least one the computational efficiency, wherein the benchmarking analysis comprises at least one computational rating required for a performance of the first computational skill using the skills exchange network;
   selecting a first IPA application and a second IPA application based on the benchmark scores, the node availability, and the benchmarking analysis;
   establishing a smart contract between the first IPA application and the second IPA application for performing the first computational skill at a set processing rate; and
   performing, by the first IPA application and the second IPA application, the first computational skill using at least one of the plurality of IPA nodes based on the smart contract.

18. The non-transitory machine-readable medium of claim 17, wherein the selecting the first IPA application and the second IPA application comprises:
   selecting, by the AI computational environment, a first node of the plurality of IPA nodes for the first IPA application and a second node of the plurality of IPA nodes for the second IPA application based on the benchmark scores, the node availability, and the benchmarking analysis, wherein the selecting the first node and the second nodes is based on a efficiency type of processing of the first computational skill selected by the AI computational environment for the efficiency processing benchmark.

19. The non-transitory machine-readable medium of claim 18, wherein the operations further comprise:
   learning, by the AI computational environment, at least one IPA task improvement for at least one of the first node or the second node based performing the first computational skill;
   updating the at least one of the first node or the second node based on the learning; and
   updating a skills registry based on the updated at least one of the first node or the second node.

20. The non-transitory machine-readable medium of claim 17, wherein the selecting the first IPA application and the second IPA application comprises:
   determining, by the AI computational environment, that the second IPA application provides the efficiency processing benchmark for a portion of the first computational skill;
   selecting, by the AI computational environment, the first IPA application for another portion of the first computational skill; and
   selecting, by the AI computational environment, the second IPA application to outsource the portion of the first computational skill at a determined price for the skills exchange network.

* * * * *